(12) United States Patent
Ravishankar et al.

(10) Patent No.: US 9,403,173 B2
(45) Date of Patent: Aug. 2, 2016

(54) PROCESS FOR ENHANCING ELECTROSTATIC SEPARATION IN THE BENEFICIATION OF ORES

(75) Inventors: Sathanjheri A. Ravishankar, Shelton, CT (US); Harsha Kolla, Fairfield, CT (US); Bing Wang, Brookfield, CT (US)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 1196 days.

(21) Appl. No.: 12/603,078

(22) Filed: Oct. 21, 2009

(65) Prior Publication Data

US 2010/0108573 A1 May 6, 2010

Related U.S. Application Data

(60) Provisional application No. 61/110,282, filed on Oct. 31, 2008, provisional application No. 61/171,305, filed on Apr. 21, 2009.

(51) Int. Cl.
*B03B 1/00* (2006.01)
*B03C 7/00* (2006.01)

(52) U.S. Cl.
CPC ..................... *B03C 7/003* (2013.01)

(58) Field of Classification Search
CPC ............. B03B 1/04; B03B 9/00; B03C 5/00; B03C 5/02
USPC ...................... 209/4, 8, 127.1–131
See application file for complete search history.

(56) References Cited

U.S. PATENT DOCUMENTS

| | | | |
|---|---|---|---|
| 3,563,375 A * | 2/1971 | Robert | 209/9 |
| 4,131,539 A | 12/1978 | Ojiri et al. | 209/127 |
| 4,834,898 A * | 5/1989 | Hwang | 252/62.56 |
| 5,502,118 A | 3/1996 | Macholdt et al. | 525/437 |
| 5,503,724 A | 4/1996 | Crose et al. | |
| 5,888,274 A | 3/1999 | Frederick | |
| 5,976,208 A | 11/1999 | Rousseau et al. | |
| 6,168,029 B1 * | 1/2001 | Henderson et al. | 209/3 |
| 2005/0132886 A1 | 6/2005 | Schultze et al. | |
| 2007/0007179 A1 * | 1/2007 | Ravishankar et al. | 209/212 |

FOREIGN PATENT DOCUMENTS

| | | |
|---|---|---|
| CA | 1333271 | 11/1994 |
| GB | 813070 A | 5/1959 |
| JP | 2006291045 A | 10/2006 |
| JP | 2007196152 A | 8/2007 |
| WO | 8100416 A1 | 2/1981 |
| WO | 9413391 A | 6/1994 |
| WO | 2004096413 A | 11/2004 |
| WO | 2007135232 A | 11/2007 |

OTHER PUBLICATIONS

Y. Higashiyama & K. Asano (1998): "Recent Progress in Electrostatic Separation Technology;" Particulate Science and Technology, 16:1, pp. 77-90; 1998.
International Search Report for PCT/US2009/061485; mailed Mar. 22, 2010.
Written Opinion for PCT/US2009/061485; mailed Mar. 22, 2010.

* cited by examiner

*Primary Examiner* — Joseph C Rodriguez
*Assistant Examiner* — Kalyanavenkateshware Kumar
(74) *Attorney, Agent, or Firm* — Charles E. Bell

(57) ABSTRACT

An electrostatic modification reagent as described herein. The electrostatic modification reagent may be used in an electric separation process for separating components from a mineral ore or sand.

16 Claims, No Drawings

PROCESS FOR ENHANCING ELECTROSTATIC SEPARATION IN THE BENEFICIATION OF ORES

CROSS-REFERENCE TO RELATED APPLICATIONS

This application claims benefit of priority to U.S. Provisional Application No. 61/110,282, filed Oct. 31, 2008 and U.S. Provisional Application No. 61/171,305, filed Apr. 21, 2009 the contents of which are incorporated herein by reference in their entirety.

BACKGROUND

1. Field of the Invention

The present invention relates to the field of separating certain mineral components of an ore from other mineral components of the same ore using electrostatic separation. Specifically, the present invention relates to electrostatic modification reagents and methods of using them in an electrostatic separation process to separate the mineral components within the ore with improved efficiency.

2. Description of the Related Art

Processing and refining many types of mineral ores, including mineral sands, sometimes known as beneficiation, generally involves the separation of certain mineral components from other mineral components.

For example a single ore or mineral sand may typically include both rutile and zircon. Both of these mineral have independent uses and must be separated from one another. Such a mineral sand may also include ilmenite, monazite, quartz, staurolite and leucoxene, which also must be separated form the rutile and zircon. Electrostatic separation is widely used in the heavy mineral ore or sand industries. An electrostatic separator applies a voltage typically in the range of 21 to 26 kV across the ore resulting in conductive components such as rutile and ilmenite to migrate to one end of the separator and the non-conductive components such as zircon to migrate to an opposing end of the separator. The stream of ground ore or mineral sand is split into two streams and each stream can be further processed to separate out its respective components using for example magnetic separation. While electrostatic separation is an effective process, it is not considered to be highly efficient.

U.S. Pat. No. 4,131,539 to Ojiri, et al. discloses a method for removing small amounts of rutile from zircon sand. This patent teaches heat treating the zircon sand in a non-oxidizing atmosphere in order to alter the surface electrostatic property of the rutile which is said to make rutile more conductive and the heat treated sand is more easily separated by electrostatic separation to reduce the titanium dioxide content of the sand. While such heating or roasting can be effective, it is energy intensive and alters the surface properties of the mineral components that may not be desirable in the down stream applications.

U.S. Pat. No. 5,502,118 to Macholdt et al. teaches the use of polymeric salts that are suitable as charge control agents and charge improvers in electrophotographic toners and developers, in triboelectrically or electrokinetically sprayable powder coatings, in electric materials and for the electrostatic separation of polymers and salt minerals. This does not however pertain to the enhanced separation of mineral components.

In one mineral separation processes, such as that shown in U.S. Pat. No. 6,168,029 to Henderson et al., which purports to increase the efficiency of the process, anionic copolymers of acrylic acid and acrylamide reagents are used. A need thus still exists for an improved, more efficient reagent and method for separating conductive mineral components from non-conductive mineral components of a common ore or mineral sand. Such improved separation could be applicable not only to the mining of rutile and zircon, but to any other ore that includes both non-conductive and conductive components having a commercial value

SUMMARY OF THE INVENTION

The present invention addresses the aforementioned and other needs by providing in one embodiment a process for the beneficiation of a mineral substrate by electrostatic separation of a dry mixture comprising a conducting component and a non-conducting component, comprising:

intermixing a mineral substrate and an electrostatic modifier to form a mixture wherein at least one of said conducting component and said non-conducting component is electrostatically modified; and applying an electric field to the mixture to thereby at least partially separate the electrostatically modified component from the mixture;

wherein the electrostatic modifier comprises a an organic compound selected from the group consisting of quaternary amines; imidazoline compounds; dithiocarbamate compounds; pyridine compounds; pyrrolidine compounds; conducting polymers, polyethyleneimines; compounds of the formula (IV):

$$R—(CONH—O—X)_n \qquad (IV)$$

wherein n in formula (IV) is 1 to 3; wherein R in formula (IV) comprises from 1 to 50 carbons; and wherein each X in formula (IV) is individually selected from the group consisting of H, M and NR'$_4$, where M is a metal ion and each R' is individually selected from the group consisting of H, $C_1$-$C_{10}$ alkyl, $C_6$-$C_{10}$ aryl, $C_7$-$C_{10}$ aralkyl and $C_{10}$-$C_{18}$ naphthylalkyl;

compounds of formula (VI):

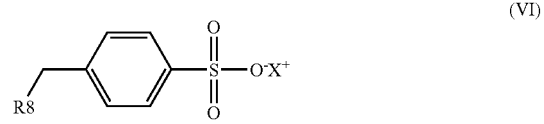

(VI)

wherein $R_8$ in formula (VI) is selected from H, $C_1$-$C_{22}$ alkyl, $C_6$-$C_{22}$ aryl, $C_7$-$C_{10}$ aralkyl, and $C_{10}$-$C_{18}$ naphthylalkyl, X in formula (VI) is selected from the group consisting of H, M and NR'$_4$, where M is a metal ion and each R' is individually selected from the group consisting of H, $C_1$-$C_{10}$ alkyl, $C_6$-$C_{10}$ aryl, $C_7$-$C_{10}$ aralkyl and $C_{10}$-$C_{18}$ naphthylalkyl; and mixtures thereof.

The present invention further relates to a process for the beneficiation of a mineral substrate by electrostatic separation of a dry mixture comprising a conducting component and a non-conducting component, comprising the steps of:

intermixing a mineral substrate and an electrostatic modification reagent to form a mixture wherein at least one of said conducting component and said non-conducting component is electrostatically modified; and applying an electric field to the mixture to thereby at least partially separate the electrostatically modified component from the mixture;

wherein the electrostatic modification reagent comprises at least one electrostatic modifier and a plurality of particles having an average specific resistivity that is greater than or equal to the specific resistivity of the non-conducting component when the non-conducting component is electrostatically modified and/or a plurality of particles having an average specific resistivity that is less than or equal to the specific resistivity of the conducting component when the conducting component is electrostatically modified.

In another embodiment, the electrostatic modification reagent comprises an electrostatic modifier and a plurality of particles, each of said particles having a specific resistivity that is greater than or equal to the specific resistivity of the non-conducting component when the non-conducting component is electrostatically modified or a plurality of particles having a specific resistivity having less than or equal to the specific resistivity of the conducting component when the conducting component is electrostatically modified.

In another embodiment, the electrostatic modification reagent comprises an electrostatic modifier, preferably an organic compound, and plurality of particles, each of said particles having a specific resistivity that is greater than or equal to the specific resistivity of the non-conducting component when the non-conducting component is electrostatically modified and/or a plurality of particles having a specific resistivity having less than or equal to the specific resistivity of the conducting component when the conducting component is electrostatically modified. The organic compound can be a polymer or a non-polymer. In another embodiment of the present invention, the electrostatic modification reagent comprises a polymer and a plurality of particles, each of said particles having a specific resistivity that is greater than or equal to the specific resistivity of the non-conducting component when the non-conducting component is electrostatically modified and/or a plurality of particles having a specific resistivity of less than or equal to the specific resistivity of the conducting component when the conducting component is electrostatically modified.

In another embodiment of the present invention, the electrostatic modification reagent comprises an organic, polymer or a non-polymer, compound selected from the group consisting of quaternary amines; imidazoline compounds; dithiocarbamate compounds; pyridine compounds; pyrrolidine compounds; conducting polymers such as polypyrroles, polythiophenes and polyanilines; polyethyleneimines; compounds of the formula (IV):

$$R-(CONH-O-X)_n \quad (IV)$$

wherein n in formula (IV) is 1 to 3; wherein R in formula (IV) comprises from 1 to 50 carbons; and wherein each X in formula (IV) is individually selected from the group consisting of H, M and $NR'_4$, where M is a metal ion and each R' is individually selected from the group consisting of H, $C_1$-$C_{10}$ alkyl, $C_6$-$C_{10}$ aryl, $C_7$-$C_{10}$ aralkyl and $C_{10}$-$C_{18}$ naphthylalkyl; compounds of formula (VI):

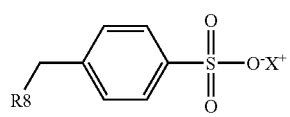

(VI)

wherein $R_8$ in formula (VI) is selected from H, $C_1$-$C_{22}$ alkyl, $C_6$-$C_{22}$ aryl, $C_7$-$C_{10}$ aralkyl, and $C_{10}$-$C_{18}$ naphthylalkyl, X in formula (VI) is selected from the group consisting of H, M and $NR'_4$, where M is a metal ion and each R' is individually selected from the group consisting of H, $C_1$-$C_{10}$ alkyl, $C_6$-$C_{10}$ aryl, $C_7$-$C_{10}$ aralkyl and $C_{10}$-$C_{18}$ naphthylalkyl; and mixtures thereof and a plurality of particles having a specific resistivity that is greater than or equal to the specific resistivity of the non-conducting component when the non-conducting component is electrostatically modified and/or a plurality of particles having a specific resistivity of less than or equal to the specific resistivity of the conducting component when the conducting component is electrostatically modified.

The present invention provides a means for improving the efficiency of electrostatic separation of conductive minerals from non-conductive minerals. A specific advantage of the present invention is to provide improved zircon and rutile product quality. Another advantage of the present invention is that it increases zircon and rutile production rates as opposed to conventional methods. Yet another advantage of the present invention is that it reduces the loss of zircon or rutile during processing. Still yet another advantage of the present invention is that it reduces the middlings and the recycling load of zircon or rutile during processing.

These and other embodiments, objects and advantages are described in greater detail below.

DETAILED DESCRIPTION OF THE PREFERRED EMBODIMENTS

Electrostatic separation is a method of separation based on the differential attraction or repulsion of charged particles under the influence of a sufficiently strong electric field. Electrostatic separation is widely used in various industries, including the heavy mineral sand industries. The beneficiation of many types of mineral ore, including heavy mineral sands, involves the separation of certain valuable mineral components from other valuable or non-valuable mineral components. Mineral separation plants used in the titanium mineral processing industry operate using similar process technologies that are often custom-designed to individual ore bodies and their separation requirements. Factors that influence the selection of a particular separation methodology include geology, mineral grade, particle size and shape, type of mineral, inclusions, surface coatings and the interfering species present, and the physical characteristics of the minerals. For example, a single ore or mineral sand may include both rutile and zircon. Both of these minerals have independent uses and therefore it is often desirable to separate relatively pure versions of each from the other, and from other impurities such as ilmenite, monazite, quartz, staurolite and leucoxene.

Electrostatic separation can be used for separating rutile and zircon since rutile is a conductive material and zircon is a non-conductive material. Electrostatic separation may be practiced by employing an electrostatic separator that applies a voltage in the range of 21-26 kV across the ore, causing the conductive components such as rutile and ilmenite to migrate to one end of the separator and the non-conductive components such as zircon to migrate to an opposing end of the separator. Thus, the stream of ground ore or mineral sand is split into two primary streams by the electrostatic separator to separate the conductive components from the non-conductive components. Electrostatic separation in accordance with the present invention can be used to separate a variety of mineral systems. These systems include, but are not limited to, mineral sand, ilmenite/staurolite, ilmenite/monazite, rutile/zircon, zircon/leucoxene, iron ore/silicate, hard rock ilmenite, hard rock rutile, metal recycling, kyanite/zircon, cromite/garnet, and celestite/gypsum.

Various embodiments of the present invention provide electrostatic modification reagents and methods of using them to improve the beneficiation of mineral substrates by improving the efficiency of electrostatic separation. In an embodiment, the electrostatic modification reagent comprises an organic non polymer compound. In another embodiment, the electrostatic modification reagent comprises an organic polymer or non-polymer compound and a plurality of nonconductive particles. In still further embodiments, the electrostatic modification reagent comprises an organic polymer or non-polymer compound and a plurality of conductive particles. In still further embodiments, the electrostatic modification reagent comprises at least one organic compound and a plurality of conductive particles and nonconductive particles.

In an embodiment, the electrostatic modification reagent comprises an organic polymer or non-polymer compound selected from the group consisting of quaternary amines; imidazoline compounds; dithiocarbamate compounds; pyridine compounds; conducting polymers such as polypyrroles, polythiophenes and polyanilines; a polyethyleneimine; a pyrrolidonium; a compound of the formula (IV):

R—(CONH—O—X)$_n$      (IV)

wherein n in formula (IV) is 1 to 3; wherein R in formula (IV) comprises from 1 to 50 carbons; and wherein each X in formula (IV) is individually selected from the group consisting of H, M and NR'$_4$, where M is a metal ion and each R' is individually selected from the group consisting of H, $C_1$-$C_{10}$ alkyl, $C_6$-$C_{10}$ aryl, $C_7$-$C_{10}$ aralkyl, and $C_{10}$-$C_{18}$ naphthylalkyl;

a compound of formula (VI):

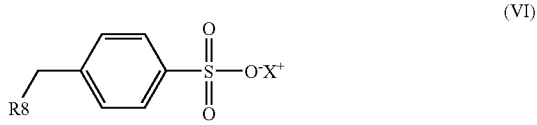

(VI)

wherein R8 in formula (VI) is selected from H, $C_1$-$C_{22}$ alkyl, $C_6$-$C_{22}$ aryl, $C_7$-$C_{10}$ aralkyl, and $C_{10}$-$C_{18}$ naphthylalkyl; X in formula (VI) is selected from the group consisting of H, M and NR'$_4$, where M is a metal ion and each R' is individually selected from the group consisting of H, $C_1$-$C_{10}$ alkyl, $C_6$-$C_{10}$ aryl, $C_7$-$C_{10}$ aralkyl, and $C_{10}$-$C_{18}$ naphthylalkyl; and mixtures thereof.

In an embodiment the quaternary amine comprises a compound of the formula (I),

R(R$_1$R$_2$R$_3$)N$^+$X$^-$      (I)

wherein R in formula (I) comprises from about 1 to about 50 carbons; wherein R$_1$, R$_2$ and R$_3$ in formula (I) are individually selected from the group consisting of H, $C_1$-$C_{10}$ alkyl, $C_6$-$C_{10}$ aryl, $C_7$-$C_{10}$ aralkyl, and $C_{10}$-$C_{18}$ naphthylalkyl; and wherein X is selected from halide, oxide, sulfide, nitride, hydride, peroxide, hydroxide, cyanide, perchlorate, chlorate, chlorite, hypochlorite, nitrate, nitrite, sulfate, sulfite, phosphate, carbonate, acetate, oxalate, tosylate, cyanate, thiocyanate, bicarbonate, permanganate, chromate, and dichromate. In an embodiment the quaternary amine has a number molecular weight of about 700 or less, more preferably, 450 or less.

By imidazoline compounds is meant to designate unsubstituted as well as substituted imidazolines, quaternized imidazolines and salts thereof. In an embodiment of the present invention the imidazoline compound comprises a compound selected from compounds of the formula (IIa) and their quaternized salts and formula (IIb):

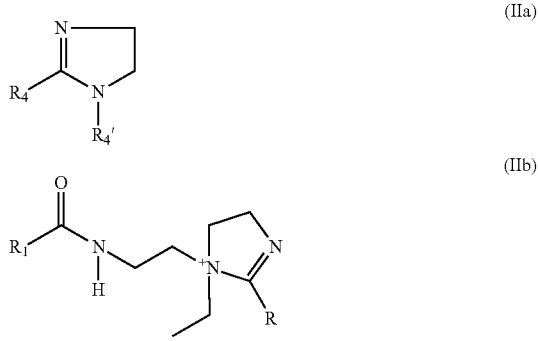

wherein R$_4$' in formula (IIa) is selected from the group consisting of $C_1$-$C_4$ alkylamine, $C_1$-$C_4$ alkoxy and $C_2$-$C_5$ alkyl; and wherein R$_4$ in formula (IIa) is selected from the group consisting of H, $C_1$-$C_{26}$ alkyl, $C_2$-$C_{26}$ alkenyl, $C_6$-$C_{26}$ aryl, $C_7$-$C_{10}$ aralkyl, and $C_{10}$-$C_{18}$ naphthylalkyl; and wherein R$_1$ in formula (IIb) is selected from the group consisting of H, $C_1$-$C_{26}$ alkyl, $C_2$-$C_{26}$ alkenyl, $C_6$-$C_{26}$ aryl, $C_7$-$C_{10}$ aralkyl, and $C_{10}$-$C_{18}$ naphthylalkyl, oleyl, and wherein R in formula (IIb) is selected from the group consisting of H, $C_1$-$C_{26}$ alkyl with and without saturated or unsaturated, oleyl, $C_2$-$C_{26}$ alkenyl, $C_6$-$C_{26}$ aryl, $C_7$-$C_{10}$ aralkyl, and $C_{10}$-$C_{18}$ naphthylalkyl.

By pyrrolidine compounds is meant to designate unsubstituted as well as substituted pyrrolidine, quaternized pyrrolidine, pyrrolidonium and salts thereof.

By dithiocarbamate compound is meant to designate compounds comprising a dithiocarbamate group as well as salts thereof. In an embodiment of the present invention, the dithiocarbamate comprises a diallylamine dithiocarbamate. In another embodiment the diallylamine dithiocarbamate is a sodiumdiallylamine dithiocarbamate of formula VII:

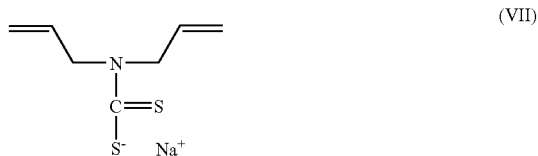

In an embodiment the compound of formula VII has a number molecular weight that is about 450 or less.

By pyridine compound is meant to designate unsubstituted as well as substituted pyridines and salts thereof, In an embodiment of the present invention the pyridine comprises a compound of the formula (III)

wherein R in formula (III) is selected from the group consisting of H, $C_1$-$C_{22}$ alkyl, $C_6$-$C_{22}$ aryl, $C_7$-$C_{10}$ aralkyl, and $C_{10}$-$C_{18}$ naphthylalkyl; and wherein X in formula (III) is selected from halide, oxide, sulfide, nitride, hydride, peroxide, hydroxide, cyanide, perchlorate, chlorate, chlorite, hypochlorite, nitrate, nitrite, sulfate, sulfite, phosphate, carbonate, acetate, oxalate, tosylate, cyanate, thiocyanate, bicarbonate, permanganate, chromate, and dichromate.

In an embodiment of the present invention, the compound of formula IV is selected from monohydroxamic acid, bihydroxamic acid and trihydroxamic acid and any salt thereof. Particularly preferred are C1-C10 alkyl hydroxamates, more preferably sodium and potassium alkyl hydroxamates.

In an embodiment of the present invention the conducting polymer comprises a polyaniline, preferably a modified polyaniline comprising a recurring unit of the formula (V):

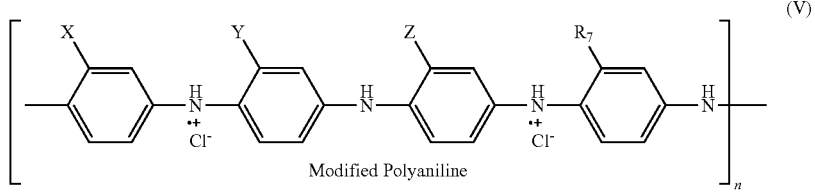

Modified Polyaniline (V)

wherein X, Y, and Z in formula (V) are each individually selected from the group consisting of —COOH, —SO$_3$H, and —CO(NH—OH); wherein R$_7$ in formula (V) is selected from H, C$_1$-C$_{22}$ alkyl, C$_6$-C$_{22}$ aryl, C$_7$-C$_{10}$ aralkyl, C$_{10}$-C$_{18}$ naphthylalkyl, sulfate, and hydroxyl; and wherein n in formula (V) is selected so that the polyaniline has a number molecular weight in the range of about 500 to about 10,000.

In an embodiment of the invention the polyethyleneimine has a molecular weight in the range of about 350 to about 1000 and preferably comprises a recurring unit of the formula (VIII)

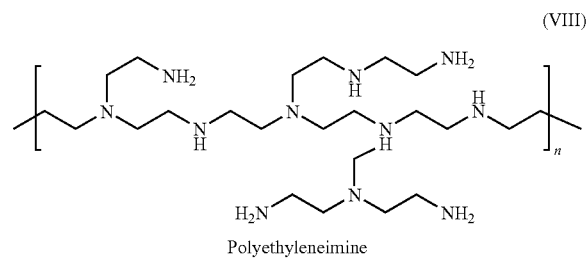

Polyethyleneimine (VIII)

wherein n in formula (VIII) is selected so that the polyethyleneimine has a molecular weight in the range of about 350 to about 1000; and mixtures thereof.

In an embodiment of the present invention the electrostatic modification reagent further comprises a plurality of particles having an average specific resistivity that is greater than or equal to the specific resistivity of the non-conducting component when the non-conducting component is the component in the mixture to be electrostatically modified and/or a plurality of particles having an average specific resistivity that is less than or equal to the specific resistivity of the conducting component when the conducting component is the component of the mixture to be electrostatically modified. The particles in the electrostatic modification reagent preferably have an average diameter of from 1 to 500 microns.

The weight ratio of electrostatic modifier to particles is preferably from about 100:1 to about 1:100.

Thus, the efficiency of electrostatic separation can be enhanced by including a plurality of particles having an average specific resistivity that is greater than or equal to the specific resistivity of the non-conducting component, herafter called "non-conductive particles", in the electrostatic modification reagent. In various embodiments, the electrostatic modification reagent comprises a plurality of non-conductive particles and an organic compound selected from the group consisting of those organic compounds set forth above.

The electrostatic modification reagent preferably comprises a plurality of non-conductive particles and at least one of the organic compound selected from the group consisting of a quaternary amines; imidazoline compounds; dithiocarbamate compounds; pyridine compounds; pyrrolidine compounds; conducting polymers; polyethyleneimines; and mixtures thereof, more preferably at least one compound selected from the group consisting of quaternary amines, imidazoline compounds, especially quaternized imidazoline compounds, and pyridine compounds. Particularly preferred are the compounds of formula (I), (IIa), (IIb) and (III).

The plurality of non-conductive particles and the organic compound can be present in the electrostatic modification reagent in a weight ratio of non-conductive particles:organic compound in the range of about 100:1 to 1:100.

In an embodiment, the non-conductive particles are selected from a silicate of the formula $(M_xO_y)_p(SiO_2)_q$, an aluminate of the formula $M_xAlO_z$, and mixtures thereof, wherein M is a metal (e.g., Al, Sn, Zr or Pb); x and y are each individually in the range of about 1 to about 4; z is in the range of 1 to about 12; and the ratio p:q is in the range of from about 10:1 to about 1:10. Other non-conductive particles that have a similar size distribution, conductivity and morphology to the silicate and aluminate particles, can be included in the electrostatic modification reagent in place of and/or in addition to such silicates and aluminates. In another embodiment, the non-conducting particles are selected from polystyrene, quartz, mica, talc, sulfur, hard rubber, shellac, Lucite, glass powder, dry wood, celluloid, ivory and mixtures thereof. Further examples of suitable non-conductive particles include those that comprise a mineral selected from the group consisting of kaolin and montmorillinite. In another example, the plurality of non-conductive particles can comprise aluminosilicate clay. Preferred are non-conductive particles that have a chemical structure and/or composition that is similar to the non-conductive component present in the mineral substrate. When the mineral substrate comprises zircon, the non-conductive particles are preferably selected from zircon, sand and silica. The non-conductive particles in the electrostatic modification reagent may be obtained from commercial sources and/or made by techniques known to those skilled in the art. More preferably, the non-conductive particles, especially the silica and zircon particles, have a high purity with iron specification below 1.0%.

The plurality of non-conductive particles in the electrostatic modification reagent can have an average diameter of less than about 500 microns, e.g., less than about 300 microns or less than about 200 microns. The non-conductive particles preferably have an average diameter of at least 1 micron, more preferably of at least 10 microns. Particularly preferred are non-conductive particles having a diameter of about 50 to 200 microns. In an embodiment, the non-conductive particles have an aspect ratio in the range of from about 1 to about 100.

Improved separation is often observed as the particle size of the non-conductive particles in the electrostatic modification reagent is decreased. For example, it may be desirable in certain applications to use non-conducting microparticles with the smallest practical particle size. Often, good results may be obtained using non-conductive particles having an average diameter of less than about 200 microns, e.g., less than about 100 microns. The plurality of non-conductive particles in the electrostatic modification reagent may have a unimodal or polymodal (e.g., bimodal) particle size distribution.

In any given situation, the size of the non-conductive particles may be selected on the basis of various practical considerations, such as cost, throughput, the mineral substrate to be treated, the desirability of excluding selected impurities, and/or the degree of separation desired. Thus, for example, in some applications a relatively low degree of separation may be obtained using an electrostatic reagent that comprises non-conducting silicate microparticles having an average particle size in the range of about 1 to about 500 microns. In other situations, e.g., when a high degree of separation is desired, smaller non-conducting microparticles are often preferred. The sizes of non-conductive particles may be determined by measuring their surface areas using the BET N2 adsorption method (see U.S. Patent Publication No. 2007/0007179). Those skilled in the art understand the relationship between particle size and surface area as determined by the BET N2 adsorption method.

In another embodiment, the efficiency of electrostatic separation is enhanced by including a plurality of particles having an average specific resistivity that is less than or equal to the specific resistivity of the conducting component, hereafter designated as "conductive particles", in the electrostatic modification reagent. Although this invention is not limited by theory of operation, it is believed that the organic compound in the electrostatic modification reagent selectively attaches the conducting particles to the conducting minerals. In various embodiments, the electrostatic modification reagent comprises a plurality of conductive particles and an organic polymer or non-polymer compound, preferably selected from those set forth above.

The electrostatic modification reagent preferably comprises a plurality of conductive particles and at least one of the organic compound selected from the group consisting of compounds of formula (IV), (V), (VI), (VII) and (VIII), more preferably a compound of formula (IV).

The plurality of conductive particles and the organic compound can be present in the electrostatic modification reagent in a weight ratio of conductive particles:organic compound in the range of about 100:1 to 1:100, e.g., in the range or about 10:1 to about 1:10.

In further embodiments, the conductive particles may comprise a metal oxide of the formula $M_xO_y$, wherein M is a transition metal, and wherein x and y are each individually in the range of about 1 to about 6. The transition metal can be selected from Cu, Co, Mn, Ti, Fe, Zn, Mo, and Ni. In some embodiments, the conductive particles may comprise a metal oxide that is a superconducting material of the formula $A_pB_qD_rO_s$ wherein A is La, Pr, Ce, Nd, Sm, Eu, Gd, Ho, Er, Tm, Yb, Lu, or Nb; B is Ca, Ba, or Sr; D is Cu, Ni, Ti, or Mo, O is oxygen, p is in the range of from about 0.01 to about 2.0; q is in the range of from about 0.5 to about 3; r is in the range of from about 0.1 to about 5; and s is in the range of from about 1 to about 10. Those skilled in the art will appreciate that in this context the term "superconducting material" refers to a material that is superconducting at a temperature above 4 K, regardless of the temperature of the electrostatic modification reagent at any given time. Other conductive particles that have a similar size distribution, conductivity and morphology to the metal oxide particles, can be included in the electrostatic modification reagent in place of and/or in addition to such metal oxides.

The plurality of conductive particles can also include any metal particles such as for example silver, copper, gold, aluminum, iron and mixtures thereof. Other conductive particles can include graphite, covellite, pentlandite, pyrrhotite, galena (lead sulfide), silicon, arsenopyrite, magnetite, chalcocite, chalcopyrite, cassetente pyrite, molybdenite and mixtures thereof. Preferred are conductive particles that have a chemical structure and/or composition that is similar to the conductive component present in the mineral substrate. When the mineral substrate comprises rutile, the conductive particles are preferably selected from rutile. More preferably the conductive particles, especially the rutile, have high purity with a presence of non-conductive particles such as silica and zircon specification below 1.0%.

The plurality of conductive particles can have an average diameter of less than about 100 microns, e.g., less than about 50 microns. The conductive particles preferably have an average diameter of at least 1 micron, more preferably of at least 10 microns. Particularly preferred are conductive particles having a diameter of about 10 to 100 microns. The sizes of conductive particles may be determined by measuring their surface areas using the BET N2 adsorption method (see U.S. Patent Publication No. 2007/0007179). Those skilled in the art understand the relationship between particle size and surface area as determined by the BET N2 adsorption method. The conductive particles in the electrostatic modification reagent may be obtained from commercial sources and/or made by techniques known to those skilled in the art.

The electrostatic modification reagent may optionally comprise additional ingredients. For example, in an embodiment, an electrostatic modification reagent comprises a liquid such an alcohol and/or water. In another embodiment, an electrostatic modification reagent comprises a dispersant. In another embodiment, an electrostatic modification reagent comprises a liquid such as an alcohol and/or water, and a dispersant. The amounts of the electrostatic modification reagent, optional liquid and optional dispersant may vary over a broad range, which may be determined by routine experimentation guided by the disclosure provided herein. For example, in an electrostatic modification reagent embodiment, the amount of liquid (e.g., water, oil (e.g., mineral oil, synthetic oil, vegetable oil), and/or alcohol) is in the range of from zero to about 95%, and the amount of dispersant is in the range of from zero to about 10%, all of the foregoing amounts being weight percent based on total weight of the electrostatic modification reagent.

The further inclusion of an optional dispersant in the electrostatic modification reagent may provide various benefits. For example, inclusion of the dispersant may facilitate dispersal of the electrostatic modification reagent that contains a liquid, and/or the dispersant may facilitate dispersal of mineral particles and/or impurities of the mineral substrate with which the electrostatic modification reagent is intermixed. The dispersant may be an organic dispersant such as a water-soluble polymer or mixture of such polymers, an inorganic dispersant such as a silicate, phosphate or mixture thereof, or a mixture of organic and inorganic dispersants. An example of a suitable organic dispersant is a water-soluble or water-dispersible polymer that comprises a least one moiety selected from the group consisting of carboxyl and sulfonate. Polyacrylic acid and Na-polyacrylate are examples of water-soluble or water-dispersible polymers that comprise a carboxyl group. Poly(2-acrylamido-2-methyl-1-propane-sulfonate), also known as poly(AAMPS), is an example of a water-soluble or water-dispersible polymer that comprises a sulfonate group. Other suitable organic dispersants include natural and synthetic gums and resins such as guar, hydroxyethylcellulose, and carboxymethylcellulose. The amount of dispersant is preferably in the range of from zero to about 15 pounds of dispersant per ton of electrostatic modification reagent.

In another embodiment, the electrostatic modification reagent is provided in a liquid form, e.g., as a dispersion. For economy, the liquid is preferably water, although the liquid form may comprise other liquids such as oil and/or alcohol, in addition to or instead of the water. The liquid is preferably present in an amount that makes the liquid form flowable, e.g., from about 25% to about 95% of liquid by weight based on total weight of the dispersion, more preferably from about 35% to about 75%, same basis. Optionally a dispersant may be used to provide for a uniform and stable dispersion of the components in the liquid. Examples of preferred dispersants include the inorganic and organic dispersants described above. The amount of dispersant in the dispersion is preferably an amount that is effective to provide a stable dispersion of the insoluble ingredients, e.g., from about 0.1% to about 10%, more preferably from about 1% to about 5% by weight based on the total weight of the dispersion.

An electrostatic modification reagent may be made in various ways. For example, in an embodiment, the electrostatic modification reagent is in the form of a substantially dry mixture, optionally further comprising a dispersant. Such a substantially dry mixture may be formed by, e.g., intermixing the components, or by suspending, dispersing, slurrying or dissolving the components in a liquid, optionally with heating and/or stifling, then removing the liquid to form a substantially dry mixture. In another embodiment, the electrostatic modification reagent is in the form of a flowable mixture comprising a liquid (e.g., water and/or alcohol), and optionally further comprising a dispersant. As indicated above, the electrostatic modification reagent in such a flowable mixture may be suspended (e.g., colloidal suspension), dispersed (e.g., dispersion) and/or slurried in the liquid, and/or one or more heteroatom-containing compounds may be suspended, dispersed, slurried and/or dissolved in the liquid. Such a flowable mixture may be formed by intermixing the components (in any order), preferably with stirring, optionally with heating. Various formulations may be prepared by employing routine experimentation informed by the guidance provided herein.

Another embodiment provides a process for the beneficiation of a mineral substrate by electrostatic separation of a dry mixture, comprising intermixing a mineral substrate and an electrostatic modification reagent to form a mixture comprising an electrostatically modified component and applying an electric field to the mixture to thereby at least partially separate the electrostatically modified component from the mixture. The electrostatic modifier present in the modification reagent selectively associates with one or more components of the mineral substrate (e.g., conductive mineral(s) or non-conductive mineral(s)) to thereby form an electrostatically modified component. Upon application of the electric field, separation of the electrostatically modified component from the remainder of the mixture is enhanced, relative to separation under substantially similar conditions in the absence of the electrostatic modification reagent. The electrostatic modification reagent used in the beneficiation process is preferably an electrostatic modification reagent as described elsewhere herein.

The mineral substrate is typically provided in a particulate form, e.g., as a crushed or milled powder. The average particle size of the particulate mineral substrate is usually less than about 1 mm. In an embodiment, the average particle size of the mineral substrate is less than about 500 microns, e.g., less than about 100 microns. In an embodiment, the average particle size of the mineral substrate is greater than about 10 microns, e.g., greater than about 30 microns. For example, in an embodiment, the average particle size of the mineral substrate is in the range of about 30 microns to about 100 microns.

The mineral substrate and electrostatic modification reagent can be intermixed in various ways, e.g., in a single stage, in multiple stages, sequentially, reverse order, simultaneously, or in various combinations thereof. For example, in an embodiment, the various components, e.g., electrostatic modification reagent, optional ingredients such as water, dispersant, etc. are added to a portion of the mineral substrate to form a pre-mix, then intermixed with the mineral substrate. In another embodiment, the electrostatic modification reagent is formed in situ by separately and sequentially intermixing the components of the electrostatic modification reagent with the mineral substrate. Alternatively, the electrostatic modification reagent may be added simultaneously (without first forming a pre-mix) to the mineral substrate. Various modes of addition are effective.

The amount of electrostatic modification reagent intermixed with the mineral substrate is preferably an amount that is effective to enhance the separation of the components of the mineral substrate, e.g., to thereby separate a value mineral from a non-value mineral, a non-conductive mineral form a conductive mineral, upon application of an electric field. In many cases it is preferable to determine the amount of electrostatic modification reagent to be intermixed with the mineral substrate on the basis of the amounts of the individual components in the electrostatic modification reagent. In an embodiment, the electrostatic modification reagent is intermixed with the mineral substrate at a ratio in the range of about 0.01 kg of electrostatic modification reagent per ton of mineral substrate to about 5 kg of electrostatic modification reagent per ton of mineral substrate. In an embodiment, the electrostatic modification reagent is intermixed with the mineral substrate at a ratio in the range of about 0.01 kg of electrostatic modifier, e.g. organic compound, per ton of mineral substrate to about 5 kg of electrostatic modifier, e.g. organic compound, per ton of mineral substrate. In an embodiment, the plurality of conducting or non-conducting particles are intermixed with the mineral substrate at a ratio in the range of about 0.01 kg of plurality of particles per ton of mineral substrate to about 5 kg of particles per ton of mineral substrate.

At any point prior to the application of the electric field, the pH of the mineral substrate may be adjusted, e.g., preferably to a pH in the range of about 6 to about 11, most preferably to a pH in the range of about 7 to about 9. To raise pH, one can use any alkali such as sodium hydroxide, or a blend of sodium silicate and sodium hydroxide. Alternatively, the pH can be adjusted using sodium silicate or soda ash.

Beneficiation or separation of the mixture into mineral components, comprising an electrostatically modified component formed by intermixing the mineral substrate and the electrostatic modification reagent, may be conducted by applying an electric field to the mixture to thereby separate the value mineral(s) from the non-value mineral(s). In an embodiment, the mixture is conditioned and dried prior to applying the electric field. Conditioning times suitable for a particular application may be determined by employing routine experimentation informed by the guidance provided herein. After conditioning, the mixture, comprising the electrostatically modified component, is typically dried to form a dry mixture having a water content of about 5% or less, e.g., about 2% or less, by weight based on total weight. Suitable drying methods known to those skilled in the art may be used.

The conditioned and dried mixture containing the electrostatically modified component may then be subjected to electrostatic separation. The electrostatic separation is preferably performed at a time that is in the range of from about immediately after conditioning to about 4 days after conditioning, e.g., within about 3 days, two days or one day after conditioning. Equipment useful for carrying out the electrostatic separation is commercially available and known to those skilled in the art.

The electrostatic modification reagent is preferably selected to achieve a degree of separation between the conductive mineral and the non-conductive mineral that is greater than the degree of separation obtained in the absence of the electrostatic modification reagent. More preferably, the degree of separation is at least about 5% greater, even more preferably at least about 10% greater, even more preferably at least about 15% greater, than a comparable degree of separation achieved in the absence of the electrostatic modification reagent.

After electrostatic separation, the resulting beneficiated product may be subjected to additional processing steps in order to provide the separated value mineral(s) and non-value mineral(s) in the form desired. Thus, any desired processing steps, such as for example magnetic separation, may be performed on the resultant beneficiated product, which includes the electrostatically modified component that has been at least partially separated from the mixture.

The present invention further relates to an electrostatic modification reagent comprising at least one electrostatic modifier and a plurality of conducting and-or non-conducting particles in a weight ratio of electrostatic modifier to particles from about 100:1 to about 1:100. In an embodiment, the electrostatic modifier can be a mixture of any and all quaternary amines and/or an imidazoline and pyrrolidonium compounds with molecular weight ranging from 450-700 and the plurality of microparticles are of any combination of silica or metal silicates or zirconium silicate with size less than 500 micrometer and aspect ratio in the range of 1 to 50 by any ratio by weight.

In an embodiment, the electrostatic modification reagent is added to a heavy mineral concentrate (HMC). In an embodiment, the reagent is added to a heavy mineral concentrate of size below 700 micrometer (0.7 mm esd).

Some embodiments of process variants for making an improvement in the separation efficacy of rutile-zircon separation using the process and electrostatic separation materials of the present invention include, but are not limited to the following (in all the order of addition of the reagent can be reversed, the step of drying can be carried out in an oven or other heating apparatus at a temperature in the range of from about 100° to about 180°, electrostatic separation can take place at any temperature, e.g. from room temperature to about 140° C., including, but not limited to temperatures as low as 50° C. or lower, and applied voltage in the electrostatic separator is from about 21 to about 27 Kv, roll speed is from about 230 to about 300 rolls per minute and feed rate is from about 35 to about 65 kg·hr/in.). Some examples of process variants for making an improvement in the separation efficacy of rutile-zircon separation include the following:

1) Make up feed at between 25 to 75% solids in water—add non-conducting silicate microparticles—then add organic compound of formula (I, IIa, IIb, III or IV)—attrition scrubbing—filter—dry at 140° C.—electrostatic separation—separate non-conducting and conducting portion—further processing 2) Make up feed at between 25-75% solids in water—add compound of formula (I or others)—attrition scrubbing—filter—dry at 140° C.—electrostatic separation—separate non-conducting and conducting portion—further processing 3) Make up feed at between 25-75% solids in water—add compound of formula (I or others)—filter—dry at 140° C.—electrostatic separation—separate non-conducting and conducting portion—further processing 4) Make up feed at between 25-75% solids in water—add non-conducting silicate microparticles-then add compound of formula (I or II or III or IV)—filter—dry at 140° C.—electrostatic separation—separate non-conducting and conducting portion—further processing 5) Make up feed at between 25-75% solids in water—add compound of formula (I or others) in a sump pump—filter—dry at 140° C.—electrostatic separation—separate non-conducting and conducting portion—further processing 6) Make up feed at between 25-75% solids in water—add non-conducting silicate microparticles—then compound of formula (I or II or III or IV) in the sump pump—filter—dry at 140° C.—electrostatic separation—separate non-conducting and conducting portion—further processing 7) Mix feed at 30-75% solids in water—add compound of formula (I or others) in the sump pump—centrifuge—dry at 140° C.—electrostatic separation—separate non-conducting and conducting portion—further processing 8) Mix feed at 30-75% solids in water—add non-conducting silicate microparticles—then compound of formula (I or II or III or IV) in the sump pump—centrifuge—dry at 140° C.—electrostatic separation—separate non-conducting and conducting portion—further processing 9) Mix feed at 30-75% solids in water—add compound of formula (I or others) in the sump pump—static mixer—filter—dry at 140° C.—electrostatic separation—separate non-conducting and conducting portion—further processing 10) Mix feed at 30-75% solids in water—add non-conducting silicate microparticles—then compound of formula (I or II or III or IV) in the sump pump—static mixer—filter—dry at 140° C.—electrostatic separation—separate non-conducting and conducting portion—further processing 11) Add compound of formula (I or others) to the feed at or before wet high intensity magnetic separator in the process flow—filter—dry at 140° C.—electrostatic separation—separate non-conducting and conducting portion—further processing 12) Make up feed at between 30-75% solids in water—add non-conducting or insulating silicate microparticles-then compound of formula (I or II or III) in the sump pump—static mixer—filter—dry at 140° C.—electrostatic separation—separate non-conducting and conducting portion—Make up feed with midlings again to 30-75% solids in water—add non-conducting or insulating silicate microparticles-then compound of formula (I or II or III)—filter—dry at 140° C. or above—electrostatic separation—separate non-conducting and conducting portion—further processing.

The process invention provides a means for improving efficiencies of electrostatic seaparation of conductive minerals from non-conductive minerals. Yet another embodiment of the invention is to apply the process to mineral mixtures, such as to mineral sand; ilmenite/staurolite mixtures; ilmenite/monazite; rutile/zircon; zircon/leucoxene; hard rock ilmenite/rutile; kyanite/zircon; cromite/garnet; celestite/gypsum; as well as to metal recycling and silicate removal from iron ore.

When applied to the processing of rutile and zircon containing minerals, the process according to the present invention provides an improved zircon and rutile product quality, as well as an increased production rate in comparison with conventional methods. Another advantage of the present invention is that it reduces the loss of zircon and/or rutile during processing. Yet another advantage is that it reduces the middlings and the recycling load of zircon and/or rutile during processing.

In foregoing embodiments of process variants, further processing may include any one or more of the following: no treatment and electrostatic separation or reagent treatment, drying and further separation by electrostatic separation.

Examples 1-7

A bulk quantity of a primarily rutile/zircon mineral substrate feed (25-30 Kg) is passed through a riffle splitter to obtain a number of mineral substrate sample batches, each containing about 500 g of the mineral substrate. The mineral substrate contains about 22% $TiO_2$ and about 59-60% $ZrSiO_4$. Each of the 500 g sample batches are separately packed and stored. For each example, a slurry is prepared by intermixing about 500 g of the dry feed and about 166.0 g of water to result in 75% solids slurry. Amounts of the electrostatic modification reagent shown in Table 1, 0.25 g or 0.5 g (0.5 or 1.0 Kg/T) are intermixed with a portion of the slurry and conditioned with high speed stifling for about one minute to form a pre-mix. The remaining slurry is then added to this mixture and conditioned at natural pH for 2, 5, or 10 minutes to form a conditioned slurry. The conditioned slurry is transferred to a tray and the solution decanted. The tray is placed in an oven at 140° C. for approximately 3 hours to form a dry mixture containing an electrostatically modified component. The dry mixture is screened through a screener (size 14) to break any agglomerates. The tray containing the screened dry mixture is placed in the oven to regain the set temperature. Then the tray is quickly removed from the oven and the screened dry mixture is passed through an electrostatic separator (model HTP(25)111-15 from Outotec, Jacksonville, Fla.) at 260 RPM roll speed, applied voltage of 23 kV, and a feed rate of 50 Kg·hr/in. An 18 tray set up is used to collect the product. Trays 1-9 (C) are designated as conducting portion, 10-12 as middlings-1 portion (M1), 13-15 as middlings-2 portion (M2), 16-17 as middlings-3 portion (M3) and 18 (NC) as the non-conducting portion. The weights in the above trays are recorded. An XRF analysis is then performed on each group (conducting, middlings-1,2,3 and non-conducting portion). The mass recovery (weight of each portion) and grades (XRF analysis) are plotted and efficiency curves are determined.

The efficiency values were first determined for individual trays. It is evaluated by the following calculations. For example for M1:

Rutile Recovery (M1), $R_{Ti}(M1) = G_{Ti}(M1) \times Wt(M1)/G_{Ti}(\text{feed}) \times \text{Total feed wt}$ Zircon Recovery (M1), $R_{Zr}(M1) = G_{Zr}(M1) \times Wt(M1)/G_{Zr}(\text{feed}) \times \text{Total feed wt}$ Cumulative Rutile Recovery (M1), $CR_{Ti}(M1) = R_{Ti}(C) + R_{Ti}(M1)$ Cumulative Zircon Recovery (M1), $CR_{Zr}(M1) = R_{Zr}(C) + R_{Zr}(M1)$ Cumulative Efficiency (M1), $CE(M1) = [CR_{Ti}(M1) + (100 - CR_{Zr}(M1)]/2$ Maximum Efficiency (ME) is highest value between cumulative efficiencies CE (C) . . . CE (M2) . . . CE (NC).

As already mentioned, if the reagent improves the separation then the Maximum efficiency (ME) of the separation with the reagent will be higher than the control (no reagent) and the difference (ΔE) of 3 to 5% is significant in the laboratory operation.

TABLE 1

Efficiency Improvement (ΔE) by specific surfactants

| Example No. | Electrostatic Modification Reagent | $\Delta E = ME_{Test} - ME_{control}$ |
|---|---|---|
| 1 | Alkyl Immidazoline | 2.0 |
| 2 | Alkyl immidazoline sold as Miramine TO-DT | 1.9 |
| 3 | Quaternary amine sold as Aero 3100C | 1.0 |
| 4 | Trialkylphosphine oxide sold as Cyanex 923 | 0.9 |
| 5 | Sodium diallylamine DiThioCarbamate | 2.4 |
| 6 | Nonylsulfonate soled as Witconic 1298 soft | 4.4 |
| 7 | Quaternary amine sold as Tego Betaine 810 | 1.1 |

Examples 8-12

A bulk quantity of the feed (25-30 Kg) is passed through a riffle splitter to provide a good representative feed sample. With continual splitting procedure, the sample size is reduced to approximately 500 g. Each of the 500 g representative sample batches are separately packed and stored. Each test contained 500 g of dry feed and about 166.0 g of water is added to result in a 75% solids slurry. The slurry is then transferred to an octagonal shaped tall tubular steel container. This is then placed under a "Delta" drill press. The reagent, 0.5 Kg/T, is added to this and homogenized for 1 minute. The feed is then added to this mixture and conditioned at natural pH for 10 minutes. The resulting slurry is transferred to a tray and the solution decanted. The tray is placed in an oven at 140° C. for approximately 3 hours and the treated feed screened through a screener (size 14) to break any agglomerates. The tray with the screened sample is placed in the oven to regain the set temperature. Then the tray is quickly removed from the oven and the sample is passed through an electrostatic separator (model HTP(25)111-15) at 260 RPM roll speed, applied voltage of 23 kV, and feed rate of 50 Kg·hr/in. An 18 tray set up is used to collect the product. Trays 1-9 (C) were designated as conducting portion, 10-12 as middlings-1 portion (M1), 13-15 as middlings-2 portion (M2), 16-17 as middlings-3 portion (M3) and 18 (NC) as the non-conducting portion. The weights in the above trays were recorded. XRF analysis is then performed on each group (conducting, middlings-1,2,3 and non-conducting portion). The mass recovery (weight of each portion) and grades (XRF analysis) are plotted to evaluate the efficiency curves.

Maximum Efficiency (ME) is highest value between cumulative efficiencies CE (C) . . . CE (M2) . . . CE (NC).

As stated hereinabove, if the reagent improves the separation then the Maximum efficiency (ME) of the separation with the reagent will be higher than the control (no reagent) and the difference (ΔE) of 3 to 5% is significant in the laboratory operation.

TABLE 2

Efficiency Improvement (ΔE) by Conducting polymers

| Examples | Reagent | $\Delta E = ME_{Test} - ME_{control}$ |
|---|---|---|
| 8 | Polypyrrole - SO3H | 1.4 |
| 9 | Polyaniline-3COOH | 2.3 |
| 10 | Polyaniline (ES) coated on lignin* | 1.7 |
| 11 | PolyEthylenelmine | 2.6 |
| 12 | Low MW copolymer of makec acid and styrene sulfonate sold as Cyanamer P80 | 2.0 |

Examples 13-19

A bulk quantity of the feed (25-30 Kg) is passed through a riffle splitter to ensure a good representative feed sample. With continual splitting procedure, the sample size is reduced to approximately 500 g. Each of the 500 g representative sample batches are separately packed and stored. Each test contained 500 g of dry feed and about 166.0 g of water is added to result in 75% solids slurry. The slurry is then transferred to an octagonal shaped tall tubular steel container. This is then placed under a "Delta" drill press. The reagent, 0.5 Kg/T Miramine OT-DT and 0.5 Kg/T of microparticles are added to this and homogenized for 1 minute. The feed is then added to this mixture and conditioned at natural pH for 10 minutes. The resulting slurry is transferred to a tray and the solution decanted. The tray is placed in an oven at 140° C. for approximately 3 hours and the treated feed screened through a screener (size 14) to break any agglomerates. The tray with the screened sample is placed in the oven to regain the set temperature. Then the tray is quickly removed from the oven and the sample is passed through an electrostatic separator (model HTP(25)111-15) at 260 RPM roll speed, applied voltage of 23 kV and a feed rate of 50 Kg·hr/in. An 18 tray set up is used to collect the product. Trays 1-9 (C) are designated as conducting portion, 10-12 as middlings-1 portion (M1), 13-15 as middlings-2 portion (M2), 16-17 as middlings-3 portion (M3) and 18 (NC) as the non-conducting portion. The weights in the above trays are recorded. XRF analysis is then performed on each group (conducting, middlings-1,2,3 and non-conducting portion). The mass recovery (weight of each portion) and grades (XRF analysis) were plotted to evaluate the efficiency curves.

Maximum Efficiency (ME) is highest value between cumulative efficiencies CE (C) . . . CE (M2) . . . CE (NC).

As mentioned before, if the reagent improves the separation then the Maximum efficiency (ME) of the separation with the reagent will be higher than the control (no reagent) and the difference (ΔE) of 3 to 5% is significant in the laboratory operation.

TABLE 3

Efficiency Improvement (ΔE) by the selective attachment of insulating particles

| Examples | Reagent | $\Delta E = ME_{Test} - ME_{control}$ |
|---|---|---|
| 13 | Miramine TO-DT(imidazoline) + Nanosilica (10 nm) | 1.2 |
| 14 | Miramine TO-DT (imidazoline) + Silica Fumed | 6.0 |
| 15 | Miramine TO-DT (imidazoline) + Zircon ground | 6.8 |
| 16 | Miramine TO-DT (imidazoline) + Sand | 5.3 |
| 17 | Valine - O (alkyl imidazoline) + zircon | 9.8 |
| 18 | CP 5596-93 (quaternarized alkyl imidazoline) + sand | 8.8 |
| 19 | Valine - O (alkyl imidazoline) + sand | 11.1 |

Examples 20-23

A bulk quantity of the feed (25-30 Kg) is passed through a riffle splitter to ensure a good representative feed sample. With continual splitting procedure, the sample size is reduced to approximately 500 g. Each of the 500 g representative sample batches are separately packed and stored. Each test contained 500 g of dry feed and about 166.0 g of water is added to result in 75% solids slurry. The slurry is then transferred to an octagonal shaped tall tubular steel container. This is then placed under a "Delta" drill press. The reagent, 0.5 Kg/T alkyl hydroxamate (S9849, Cytec Industries) (formula IV) and microparticles are added to this and homogenized for 1 minute. The feed is then added to this mixture and conditioned at natural pH for 2, 5 or 10 minutes. The resulting slurry is transferred to a tray and the solution decanted. The tray is placed in an oven 140° C. for approximately 3 hours and the treated feed screened through a screener (size 14) to break any agglomerates. The tray with the screened sample is placed in the oven to regain the set temperature. Then the tray is quickly removed from the oven and the sample is passed through an electrostatic separator (model HTP(25)111-15) at 260 RPM roll speed, applied voltage of 23 kV, and feed rate of 50 Kg·hr/in. An 18 tray set up is used to collect the product. Trays 1-9 (C) are designated as conducting portion, 10-12 as middlings-1 portion (M1), 13-15 as middlings-2 portion (M2), 16-17 as middlings-3 portion (M3) and 18 (NC) as the non-conducting portion. The weights in the above trays were recorded. XRF analysis is then performed on each group (conducting, middlings-1,2,3 and non-conducting portion). The mass recovery (weight of each portion) and grades (XRF analysis) are plotted to evaluate the efficiency curves.

Maximum Efficiency (ME) is highest value between cumulative efficiencies CE (C) . . . CE (M2) . . . CE (NC).

As stated hereinabove, if the reagent improves separation then the Maximum Efficiency (ME) of the separation with the reagent will be higher than the control (no reagent). a difference (ΔE) of 3 to 5% is significant in the laboratory operations.

TABLE 4

Efficiency Improvement (ΔE) by the selective attachment of Conducting Particles

| Examples | Reagent | $\Delta E = ME_{Test} - ME_{control}$ |
|---|---|---|
| 20 | Alkyl Hydroxamate sold as S9849 + TiO2 nanoneedles | 0.2 |
| 21 | S9849 + TiO2 nanoparticles (5 nm) | 1.6 |
| 22 | S9849 + TiO2 powder | 0.6 |
| 23 | S9849 + Rutile ground | 5.4 |

What is claimed is:

1. A process for beneficiating a mineral substrate by electrostatic separation, said mineral substrate comprising a conducting mineral component and/or a non-conducting mineral component, the process comprising the steps of:
   intermixing the mineral substrate and an electrostatic modification reagent in a liquid medium to form a slurry, wherein at least one of said conducting mineral component and/or said non-conducting mineral component is electrostatically modified;
   drying said slurry to form a substantially dry mixture; and
   applying an electric field to the substantially dry mixture, thereby separating at least a portion of the electrostatically modified mineral component from the substantially dry mixture;
   wherein the electrostatic modification reagent comprises an electrostatic modifier chosen from an organic compound selected from the group consisting of quaternary amines; imidazoline compounds; dithiocarbamate compounds; pyridine compounds; pyrrolidine compounds; conducting polymers; polyethyleneimines; compounds of the formula (IV):

$$R\text{—}(CONH\text{—}O\text{—}X)_n \tag{IV}$$

wherein n is 1 to 3; wherein R of formula (IV) comprises from 1 to 50 carbon atoms; and wherein each X of formula (IV) is individually chosen from a member selected from the group consisting of H, M, and NR'$_4$, where M is a metal ion and each R' is individually chosen from a member selected from the group consisting of H, $C_1$-$C_{10}$ alkyl, $C_6$-$C_{10}$ aryl, $C_7$-$C_{10}$ aralkyl, and $C_{10}$-$C_{18}$ naphthylalkyl;
   compounds of formula (VI):

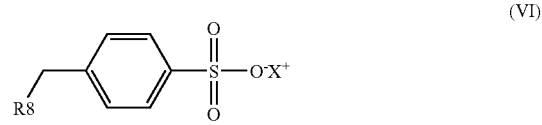

(VI)

wherein $R_8$ is chosen from a member selected from the group consisting of H, $C_1$-$C_{22}$ alkyl, $C_6$-$C_{22}$ aryl, $C_7$-$C_{10}$ aralkyl, and $C_{10}$-$C_{18}$ naphthylalkyl; and X of formula (VI) is chosen from a member selected from the group consisting of H, M, and NR'$_4$, where M is a metal ion and each R' is individually chosen from a member selected from the group consisting of H, $C_1$-$C_{10}$ alkyl, $C_6$-$C_{10}$ aryl, $C_7$-$C_{10}$ aralkyl and $C_{10}$-$C_{18}$ naphthylalkyl; and mixtures thereof.

2. The process according to claim 1, wherein the electrostatic modifier comprises a quaternary amine compound according to formula (I):

$$R(R_1R_2R_3)N^+X^- \tag{I}$$

wherein R of formula (I) comprises from 1 to 50 carbon atoms;
wherein each of $R_1$, $R_2$ and $R_3$ are individually chosen from a member selected from the group consisting of H, $C_1$-$C_{10}$ alkyl, $C_6$-$C_{10}$ aryl, $C_7$-$C_{10}$ aralkyl, and $C_{10}$-$C_{18}$ naphthylalkyl; and wherein X of formula (I) is chosen from a member selected from the group consisting of halide, oxide, sulfide, nitride, hydride, peroxide, hydroxide, cyanide, perchlorate, chlorate, chlorite, hypochlorite, nitrate, nitrite, sulfate, sulfite, phosphate, carbonate, acetate, oxalate, tosylate, cyanate, thiocyanate, bicarbonate, permanganate, chromate, and dichromate.

3. The process according to claim 2, wherein the quaternary amine compound has a number average molecular weight of 700 or less.

4. The process according to claim 1, wherein the electrostatic modifier comprises an imidazoline compound chosen from
a compound of formula (IIa)

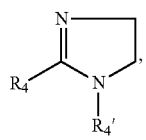
(IIa)

or a quaternized salt thereof;
wherein $R_4'$ is chosen from a member selected from the group consisting of $C_1$-$C_4$ alkylamine, $C_1$-$C_4$ alkoxy and $C_2$-$C_5$ alkyl; and wherein $R_4$ is chosen from a member selected from the group consisting of H, $C_1$-$C_{26}$ alkyl, $C_2$-$C_{26}$ alkenyl, $C_6$-$C_{26}$ aryl, $C_7$-$C_{10}$ aralkyl, and $C_{10}$-$C_{18}$ naphthylalkyl; and/or
a compound of formula (IIb):

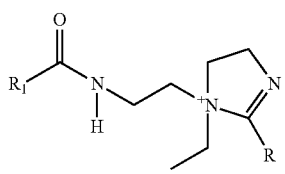
(IIb)

wherein $R_1$ of formula (IIb) is chosen from a member selected from the group consisting of H, $C_1$-$C_{26}$ alkyl, $C_2$-$C_{26}$ alkenyl, $C_6$-$C_{26}$ aryl, $C_7$-$C_{10}$ aralkyl, $C_{10}$-$C_{18}$ naphthylalkyl, and oleyl; and wherein R of formula (IIb) is chosen from a member selected from the group consisting of H, $C_1$-$C_{26}$ alkyl, oleyl, $C_2$-$C_{26}$ alkenyl, $C_6$-$C_{26}$ aryl, $C_7$-$C_{10}$ aralkyl, and $C_{10}$-$C_{18}$ naphthylalkyl.

5. The process according to claim 4, wherein the imidazoline compound is chosen from
a compound according to formula (IIa), wherein $R_4'$ is $C_1$-$C_4$ alkoxy and $R_4$ is $C_1$-$C_{26}$ alkyl;
a compound according to formula (IIb), wherein R is oleyl and $R_1$ is oleyl; or mixtures thereof.

6. The process according to claim 5, wherein the compound according to formula (IIa) is:

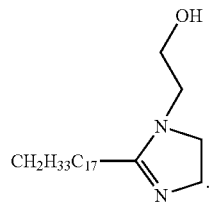

7. The process according to claim 5, wherein the compound according to formula (IIb) is:

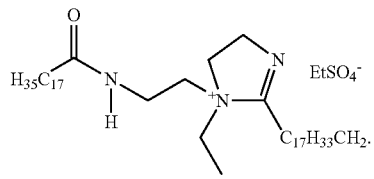

8. The process according to claim 1, wherein the electrostatic modifier comprises a dithiocarbamate compound.

9. The process according to claim 8, wherein the dithiocarbamate compound is sodiumdiallylamine dithiocarbamate.

10. The process according to claim 1, wherein the electrostatic modifier comprises a pyridine compound according to formula (III):

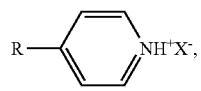
(III)

wherein R of formula (III) is chosen from a member selected from the group consisting of H, $C_1$-$C_{22}$ alkyl, $C_6$-$C_{22}$ aryl, $C_7$-$C_{10}$ aralkyl, and $C_{10}$-$C_{18}$ naphthylalkyl; and wherein X of formula (III) is chosen from a member selected from the group consisting of halide, oxide, sulfide, nitride, hydride, peroxide, hydroxide, cyanide, perchlorate, chlorate, chlorite, hypochlorite, nitrate, nitrite, sulfate, sulfite, phosphate, carbonate, acetate, oxalate, tosylate, cyanate, thiocyanate, bicarbonate, permanganate, chromate, and dichromate.

11. The process according to claim 1, wherein the electrostatic modifier comprises a conducting polymer comprising a polyaniline compound according to formula (V):

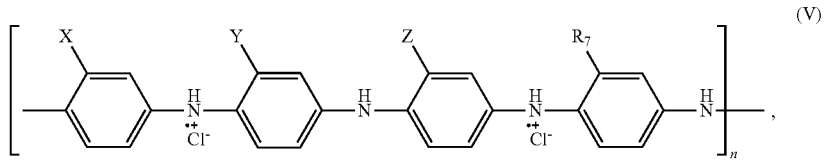
(V)

wherein each of X, Y, and Z of formula (V) is individually chosen from a member selected from the group consisting of —COOH, —SO₃H, and —CO(NH—OH);

wherein $R_7$ is chosen from a member selected from the group consisting of H, $C_1$-$C_{22}$ alkyl, $C_6$-$C_{22}$ aryl, $C_7$-$C_{10}$ aralkyl, $C_{10}$-$C_{18}$ naphthylalkyl, sulfate, and hydroxyl; and wherein n of formula (V) is selected so that the polyaniline has a number average molecular weight from 500 to 10,000.

12. The process according to claim 1, wherein the electrostatic modifier comprises a compound of formula (IV) and is chosen from a $C_1$-$C_{10}$ alkyl hydroxamate, or salts thereof.

13. The process according to claim 12, wherein the alkyl hydroxamate is selected from the group consisting of mono-, di-, or tri-hydroxamic acids, sodium salts thereof, potassium salts thereof, and mixtures thereof.

14. The process according to claim 1, wherein the electrostatic modifier comprises a polyethyleneimine compound according to formula (VIII)

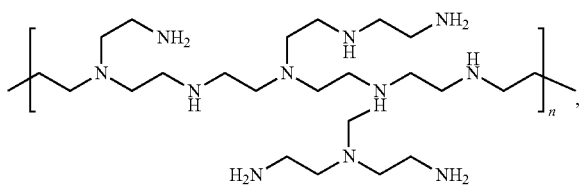

(VIII)

or mixtures thereof wherein n of formula (VIII) is selected so that the polyethyleneimine has a number average molecular weight from 350 to 1000.

15. The process according to claim 1, wherein the electrostatic modification reagent is intermixed with the mineral substrate in an amount that is from 0.01 kg to 5 kg of electrostatic modifier per ton of mineral substrate.

16. The process according to claim 1, wherein the mineral substrate comprises rutile and zircon containing minerals.

* * * * *